US008014966B2

(12) United States Patent
Reed et al.

(10) Patent No.: US 8,014,966 B2
(45) Date of Patent: Sep. 6, 2011

(54) CALIBRATION AND SETUP UNIT FOR BARRIER OPERATOR CONTROL SYSTEM

(75) Inventors: Brett A. Reed, Alliance, OH (US); Ralph C. Angiuli, Canfield, OH (US); Michael T. McMahon, Salem, OH (US)

(73) Assignee: Overhead Door Corporation, Dallas, TX (US)

( * ) Notice: Subject to any disclaimer, the term of this patent is extended or adjusted under 35 U.S.C. 154(b) by 772 days.

(21) Appl. No.: 11/473,621

(22) Filed: Jun. 23, 2006

(65) Prior Publication Data

US 2007/0294961 A1 Dec. 27, 2007

(51) Int. Cl.
*G01D 18/00* (2006.01)

(52) U.S. Cl. .......................................................... 702/85

(58) Field of Classification Search ..................... 702/85
See application file for complete search history.

(56) References Cited

U.S. PATENT DOCUMENTS 5,493,812 A 2/1996 Teich
6,118,243 A 9/2000 Reed et al.
6,184,641 B1 2/2001 Crimmins et al.
6,184,787 B1 2/2001 Morris
6,194,851 B1 2/2001 Denault et al.
6,218,962 B1 4/2001 Fiene
6,388,412 B1 * 5/2002 Reed et al. .................... 318/466
6,553,238 B1 4/2003 Ginzel et al.
6,624,605 B1 9/2003 Powder et al.
6,634,408 B2 10/2003 Mays
6,737,823 B2 * 5/2004 Reed et al. .................... 318/466
6,737,968 B1 5/2004 Ergun et al.
6,895,355 B2 5/2005 Fitzgibbon
7,355,363 B2 4/2008 Angiuli et al.
2002/0180600 A1 12/2002 Kirkland et al.
2003/0112123 A1 6/2003 Hom et al.
2003/0201743 A1 10/2003 Study et al.
2004/0239496 A1 12/2004 Fitzgibbon
2005/0012631 A1 1/2005 Gregori et al.
2005/0253731 A1 11/2005 Fitzgibbon et al.
2006/0132284 A1 6/2006 Murphy et al.
2006/0178792 A1 * 8/2006 Ortiz et al. ...................... 701/33

FOREIGN PATENT DOCUMENTS

CA 2308506 A1 11/2001

* cited by examiner

*Primary Examiner* — Aditya Bhat
(74) *Attorney, Agent, or Firm* — Gardere Wynne Sewell, LLP

(57) ABSTRACT

A setup and calibration unit for a barrier operator is operable to communicate with the operator's own controller. The calibration unit includes a control circuit connected to a visual display and to a set of switches controlled by switch actuators for placing the operator controller in a controller run mode or calibration mode, scrolling through selected actions displayed on the display in one direction or the other, a set/clear function and display backlighting for user interaction with the setup and calibration unit. The setup and calibration unit is particularly adapted for use with upward acting sectional and roll-up doors and other types of barriers movable between open and closed positions by motorized operators. The calibration unit may be operably connected to the operator controller via hard wiring, a radio frequency link or an infrared or visible light transmission link.

20 Claims, 6 Drawing Sheets

CALIBRATION AND SETUP UNIT FOR BARRIER OPERATOR CONTROL SYSTEM

BACKGROUND OF THE INVENTION

In the development of barriers, including sectional garage doors and so-called industrial upward-acting doors, for example, motor driven operators for such barriers have become relatively complex. Such operators may include one or more ancillary devices, such as beam transmitting type obstruction detectors for the opening to be covered by the barrier and/or obstruction detectors disposed on an edge of the barrier. Modes of operation, such as a so-called normal run mode, a learn mode and automatic operating modes, and the detection of needs for maintenance of operator systems, have also rendered the control systems for barrier operators increasingly complex.

Accordingly, there has been a clear need for a device which may be permanently or temporarily connected to a barrier operator control system and used to set the operating parameters of the control system, analyze any fault conditions that may exist within the control system and the operator, and perform so-called calibration functions for modifying the operating parameters of the control system. Desired features include a calibration or setup unit or device which can recognize the specific type of operator to which it is connected, determine which optional accessory features may be connected to the operator or its control system and provide a thorough checklist of calibration and/or setup functions to alleviate the possibility that a technician setting up the operator control system would forget to calibrate or implement a particular control function.

It is to meet the desiderata mentioned above, as well as other desired features and needs in calibration and setup of barrier operator controls, that the present invention has been developed.

SUMMARY OF THE INVENTION

The present invention provides a calibration and so-called setup device and method particularly adapted for establishing control functions in a barrier operator control system, such as used on or in conjunction with residential garage door operators, as well as industrial or commercial barrier or door operators of various types.

In accordance with one aspect of the present invention a calibration and setup unit or device is provided which includes a control circuit, preferably comprising a microcontroller, a visual display and plural pushbutton type switch actuators interconnected with miscellaneous circuitry dedicated to functions related to use of the device. The calibration unit microcontroller controls all aspects of the unit's operation and communication with an operator control system to which it is connected. A serial or parallel communication system can be provided which is either a hardwired digital link access via a plug-in connector, via a radio frequency link or an infrared or visible light spectrum link, for example.

In accordance with another aspect of the invention a calibration unit or device is provided which includes a display which communicates all information to the user, including current operator status, current calibration status and other explanatory information which may prompt the user to take certain actions. Single or multi-character, numeric or alphanumeric identifiers are provided, preferably via a liquid crystal display (LCD), a light emitting diode (LED) display, a vacuum fluorescent display or a cold cathode fluorescent display. Alternatively, a series of indicators, such as discrete LEDs and the like, may be arranged in a matrix.

In accordance with still a further aspect of the invention, a calibration unit for a barrier operator is provided with plural switches and actuators therefor which may include DIP switch actuators, conductive elastomer or polymer switch actuators, discrete electromechanical switch actuators or other devices that serve a similar function for placing the calibration unit control circuitry in a calibration mode, a normal run mode for the barrier operator control system, provide menu scrolling functions, backlighting activation for the unit display, function set/clear commands and other and similar functions. The keypad may be a complete alphanumeric pad or include scroll keys to allow the user to quickly cycle through available sequences of available features moving up or down in a preprogrammed sequence.

The calibration unit of the invention is particularly adapted for use with operator control systems which retain their own calibration and set up data in a nonvolatile memory and pass pertinent data along to accessory devices such as timer operator closing modules and other auxiliary modules installed as part of an operator system and which may retain their calibration/setup data in additional nonvolatile memories.

Still further, a calibration unit or device in accordance with the invention is adapted for radio frequency (RF) communication between a calibration device microcontroller and its RF transceiver and an RF transceiver connected to a barrier operator control microcontroller. Alternatively, the calibration unit or device may communicate with the operator control microcontroller by way of an infrared (IR) or visible light spectrum communication link or an actual hard wired communications link.

Those skilled in the art will recognize the above-mentioned features and advantages of the invention together with other superior aspects thereof upon reading the detailed description which follows in conjunction with the drawings.

DETAILED DESCRIPTION OF PREFERRED EMBODIMENTS

Figure 1:
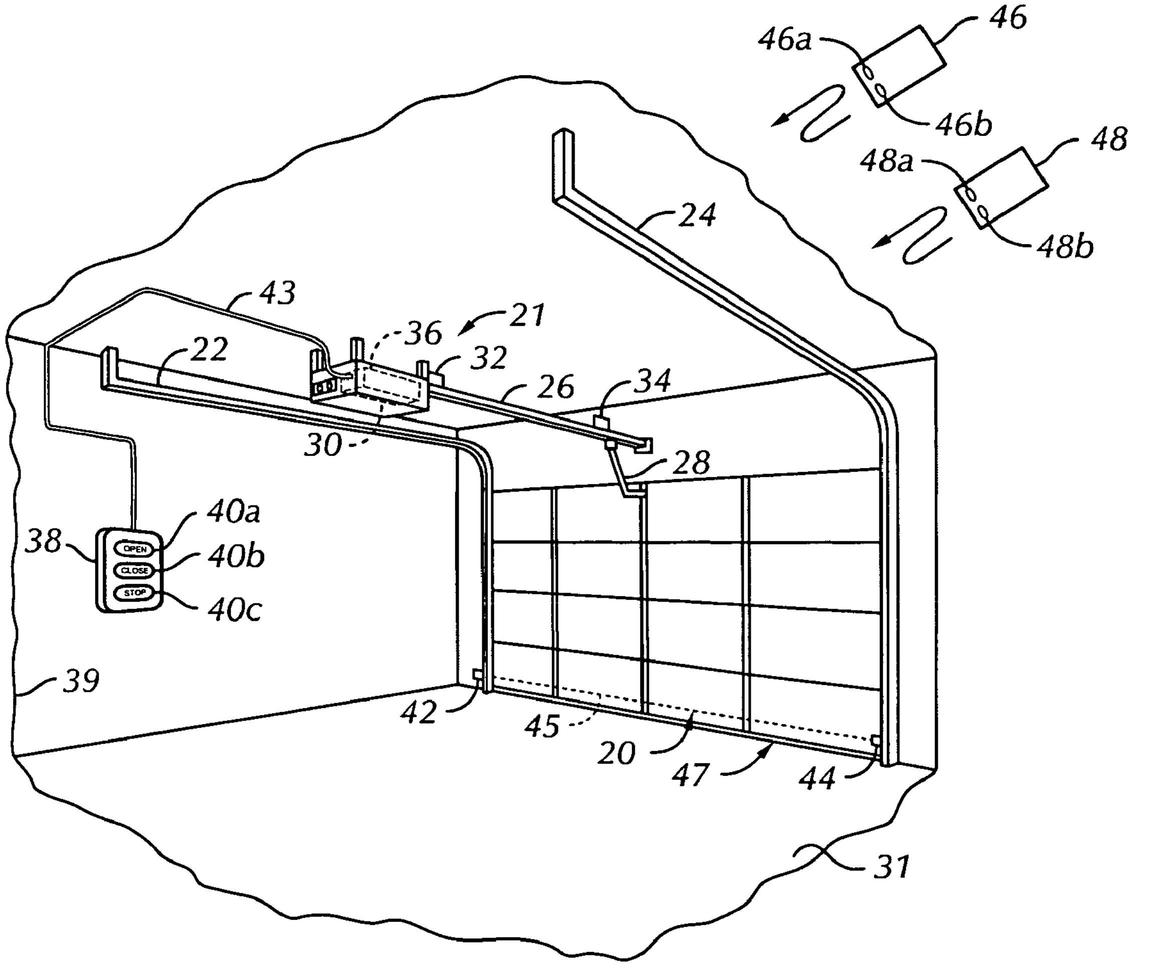
FIG. 1 is a perspective view in somewhat schematic form of a barrier and barrier operator adapted for setup and calibration by the setup and calibration unit of the present invention.

In the description which follows like elements are marked throughout the specification and drawing with the same reference numerals, respectively. The drawing figures are not necessarily to scale and certain features may be shown in generalized or schematic form in the interest of clarity and conciseness.

Referring now to FIG. 1, there is illustrated a movable barrier 20 which is characterized by way of example as a sectional upward-acting garage door. The barrier 20 is movable between the closed position shown and an open position on spaced apart generally parallel guide tracks 22 and 24. The barrier 20 is adapted to be moved between open and closed positions by a motorized operator, generally designated by the numeral 21, which may be one of several types and includes an elongated support 26 for supporting an operator actuating mechanism, not shown in detail, but connected to an arm 28 which, in turn, is connected to the barrier 20. By way of example also, the support 26 may include spaced-apart barrier position limit switch mechanisms for controlling the limit positions of the door in both an open limit position and a closed limit position. The operator 21 includes a housing or frame 30 supporting a motor 36 connected to the mechanism which is carried by support 26 for moving the arm 28 and the barrier 20 between the limit positions described. Barrier 20 is movable to close an opening in a structure, such as a residential or commercial garage, industrial building or any structure which requires a motorized movable barrier for closing over an opening. The aforementioned building includes a sidewall 39 and a floor 31, as indicated.

Referring further to FIG. 1, the operator 21 may be controlled by various control devices including a wall-mountable control console 38 having one or more push button type switch actuators 40*a*, 40*b* and 40*c* disposed thereon. The wall-mountable control console 38 may be hardwired to an operator controller for motor 36, as indicated at 43, or the control console 38 may communicate with the operator controller by radio frequency transceivers, for example, generally in accordance with the teaching of U.S. patent application Ser. No. 11/301,584 filed on Dec. 13, 2005 by Larry D. Murphy et al. and assigned to the assignee of the present invention.

Referring still further to FIG. 1, the barrier 20 may be provided with one or more obstruction detectors, such as a beam emitting-type obstruction detector indicated by numerals 42 and 44. This type of obstruction detector may comprise an infrared, visible light or X-ray type radiation beam emitter and cooperating receiver for generating a signal when a beam 45 is interrupted. The obstruction detector 42, 44 may be one of several types known in the art. The barrier 20 may also include a second obstruction detector, generally designated by numeral 47, and mounted on the lower transverse edge of the barrier 20, as indicated in FIG. 1. Obstruction detector 47 is responsive to engagement with an obstruction disposed in the opening closable by the barrier 20 to transmit a signal to the aforementioned operator controller to effect stopping and/or reversing movement of the barrier. Still further, the barrier 20 may be controlled by remote transmitters or transceivers, indicated by numerals 46 and 48, which are adapted to transmit radio frequency signals to the controller for the operator 21 for remote control thereof. The remote control units 46 and 48 may have one or more control switch actuators included therein for use by persons wishing to control movement of the barrier 20, such switch actuators being indicated by numerals 46*a*, 46*b*, 48*a* and 48*b*, respectively.

Figure 2:
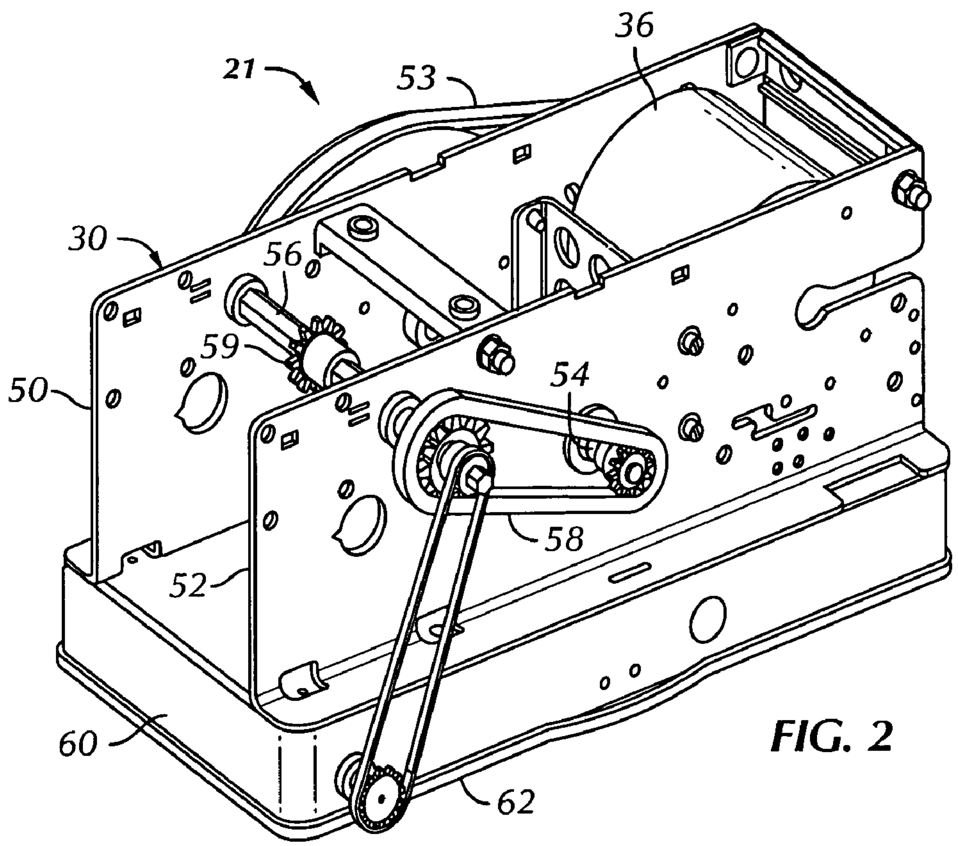
FIG. 2 is a perspective view of one embodiment of an operator adapted for use with the setup and calibration unit of the invention.

Referring now to FIG. 2, there is illustrated in greater detail a major portion of the operator 21, which is exemplary. FIG. 2 illustrates the operator frame or housing 30 which includes spaced-apart support plates 50 and 52 supporting motor 36 and a drive train including a belt drive 53 for driving an intermediate shaft 54 mounted on frame plates 50 and 52 which drives an output shaft 56 by way of a flexible belt or chain drive mechanism 58. Shaft 56 may, as shown, have a chain sprocket 59 drivenly supported thereon and connected to an endless chain which is, in turn, supported by the support 26 and operably connected to the arm 28 in a known manner. A controller for the operator 21 is preferably mounted in a suitable housing 60 forming a part of the frame 30 and having a removable cover 62 to provide access to certain controller features including a setup and calibration unit in accordance with the invention.

Figure 6:
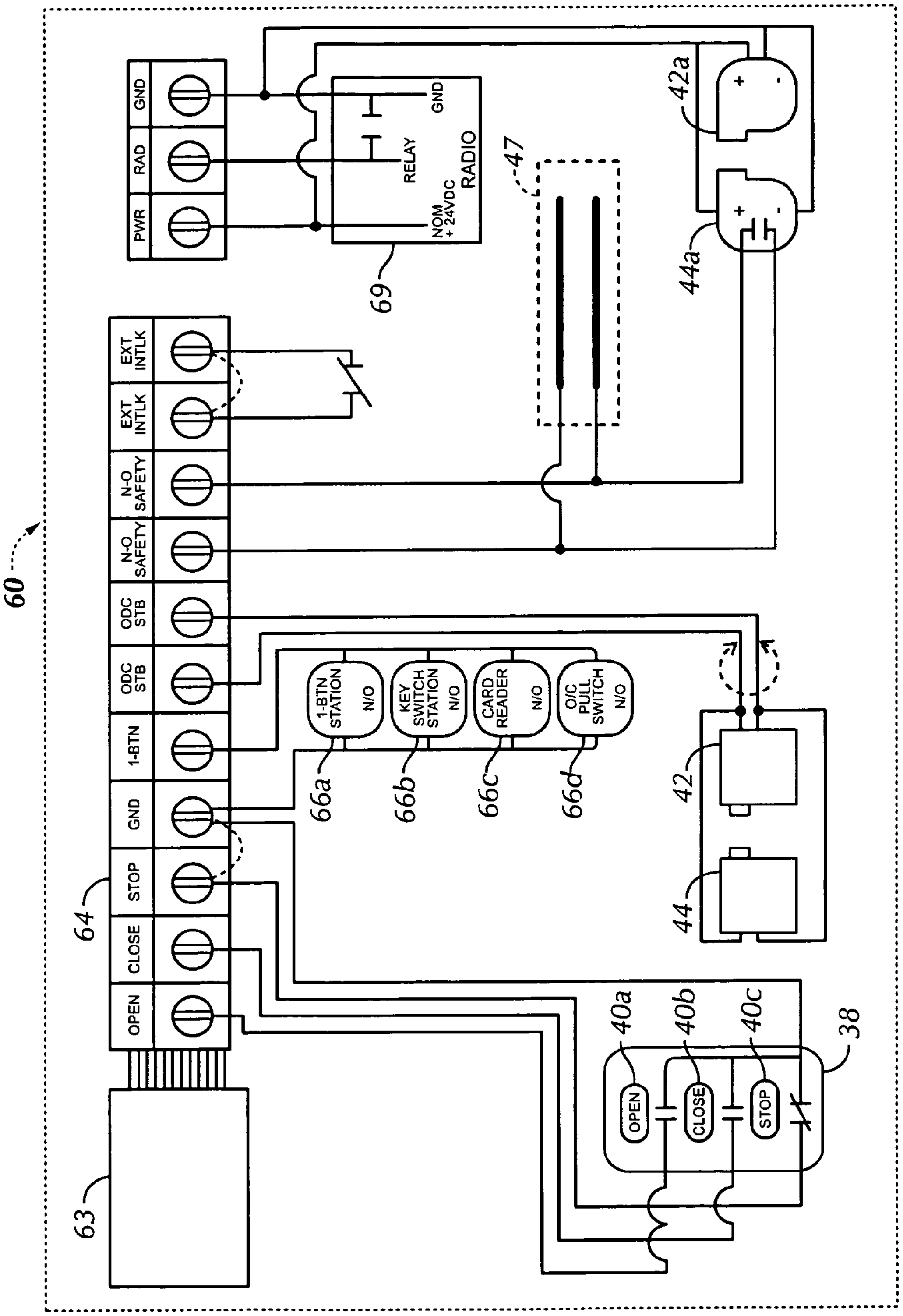
FIG. 6 is a schematic diagram of a portion of a barrier operator control system adapted for use with the unit of the present invention.

Referring briefly to FIG. 6, there is illustrated a schematic diagram of the external wiring and accessory items which are operable to provide control signals to the operator controller, generally designated by numeral 63, including a control signal terminal strip 64 disposed within the housing 60, as illustrated. Certain elements not actually disposed within the enclosure or housing 60 are shown in FIG. 6 for convenience including the wall-mountable controller 38, the obstruction detector 42, 44 and the obstruction detector 47, for example. The controller terminal strip 64 is also operable to be connected to an alternate or further obstruction detector, indicated by numeral 42*a*, 44*a*. Still further, other remote operator control devices 66*a*, 66*b*, 66*c* and 66*d* may be utilized with the controller 63. Radio control signals may also be communicated to the controller 63 via a radio 69 via suitable connections not shown, and which radio is operable to be in communication to the remote control units 46 and 48.

Figure 3:
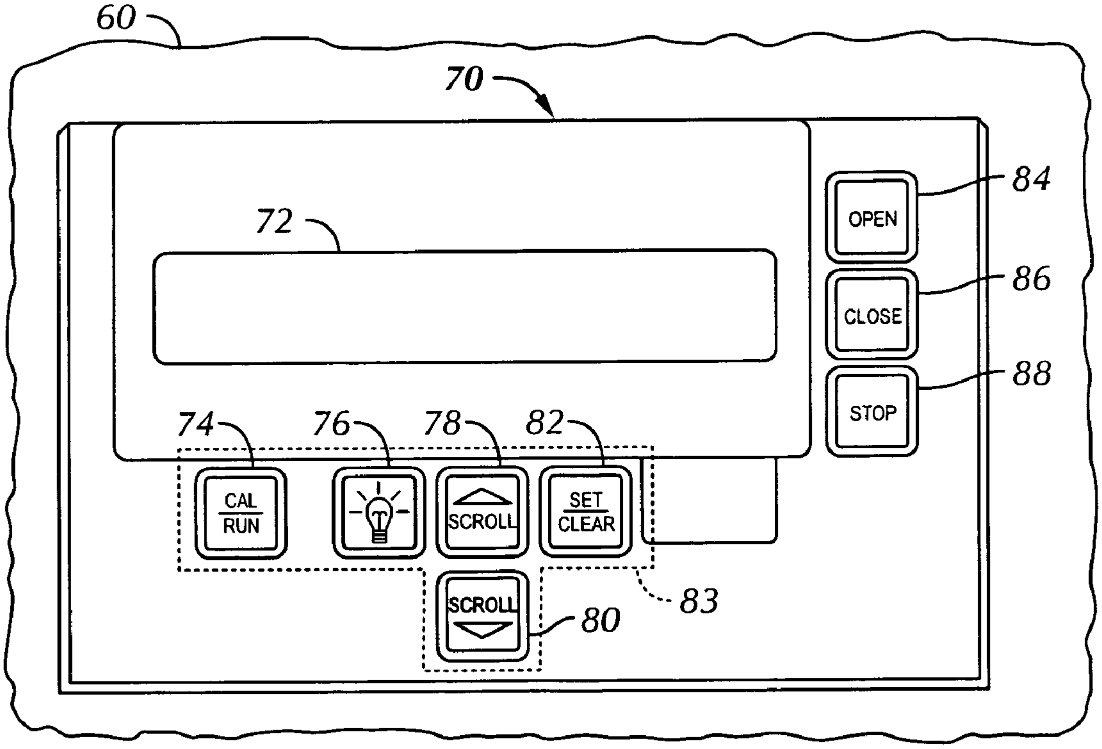
FIG. 3 is a diagram of a control panel for a barrier operator control system setup and calibration unit in accordance with the invention.

Housing 60 is also adapted to include a built-in controller setup and calibration unit or device in accordance with the invention and generally designated by the numeral 70 in FIG. 3. Setup and calibration unit 70 includes a visual display 72. Push-button type switch actuators include an actuator 74 for a calibrate/run switch, a display backlight intensity switch includes an actuator 76, so-called up and down menu scroll switch actuators 78 and 80 and a set and clear switch actuator 82 may collectively be referred to as calibration unit inputs 83. For convenience, duplicate operator open, close and stop switch actuators 84, 86 and 88 are provided, respectively. The setup and calibration unit 70 may be incorporated in a control system for an operator, as illustrated, or configured as a separate unit which may be temporarily connected to a barrier operator controller or control system by one of several communications links to be described herein. The unit 70 provides ease of setup and calibration for a control system of the type described herein and, advantageously, may be removable therefrom when the operator controller calibration or setup is completed. Thus the cost of the control system for the operator can be reduced accordingly. The calibration unit 70 includes a microcontroller, the display 72 and the switch input or actuators illustrated and described hereinabove. Further details of the control circuitry associated with the setup and calibration unit 70 will now be described in conjunction with FIGS. 4 and 5.

Figure 5:
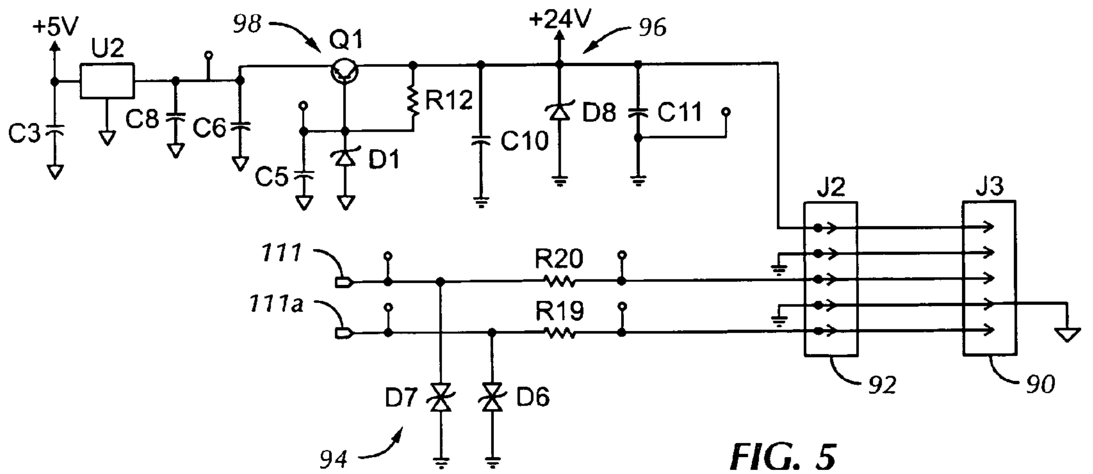
FIG. 5 is a schematic diagram of a further portion of the control circuitry for the setup and calibration unit.

Referring briefly to FIG. 5, electrical power for the calibration unit 70 and communication with the controller 63 may be provided via a connector to the operator 21, generally designated by the numeral 90, or another connector 92 to a device, not shown, such as a controller expansion board or the like. Transient protection circuitry 94 is provided in the circuit of FIG. 5 and twenty-four volt power is provided by circuit components indicated generally at 96. Regulated five volt power for control elements of the calibration unit 70 are provided by circuit elements indicated generally by the numeral 98.

Figure 4:
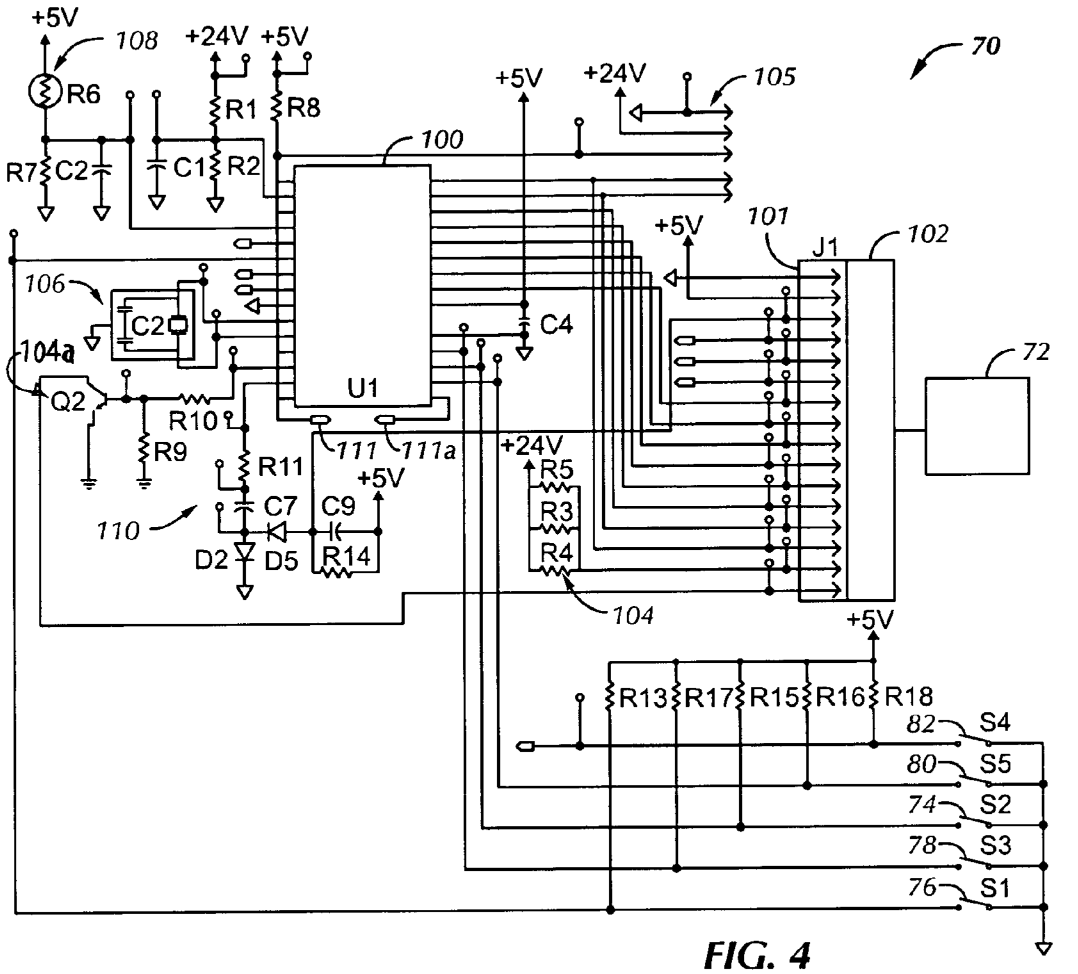
FIG. 4 is a schematic diagram of a major portion of the circuitry for the setup and calibration unit of the invention.

Referring now to FIG. 4, in particular, the calibration unit 70 includes a control circuit comprising a microcontroller 100 which may be of a type commercially available such as a model PIC16F876 available from Microchip Technology, Inc. of Chandler Ariz. While microcontroller 100 may be a preferred embodiment of a calibration unit control circuit, such could be characterized by another programmable logic device, an application specific integrated circuit (ASIC) or a discrete logic circuit, for example. For convenience herein the further discussion will use the term microcontroller for the control circuit 100. Microcontroller 100 is operably connected to a connector set 101, 102 to provide communication to the visual display 72. Power for the backlighting of the display 72 is supplied via circuit components indicated generally at 104 and 104*a* in FIG. 4. A connector 105 provides for connection to apparatus, not shown, for programming microcontroller 100. A timing circuit for the microcontroller 100 is indicated at 106 and a temperature sensor for adjusting the operation of the display 72, if such is an LCD type, is indicated generally at 108. A bias circuit for the display 72, if of an LCD type, is indicated at 110. Connections 111 and 111*a* are provided for communication between microcontroller 100 and controller 63, see FIG. 5 also, and connections 111 and 111*a* may be connected to a remote or directly connected transceiver, not shown, for operation of the calibration unit 70 remotely.

Operation of the calibration unit 70 to set various operating parameters of the controller 63 is advantageous in that it provides for ease of calibration and setup of operation of the controller but may be removable after the calibration or setup operation is complete. Thus the control system for the operator 21 does not require the additional cost of having the calibration capability. Moreover, communication between the calibration unit 70 and the controller 63 can be a serial or parallel hardwired, digital link accessed via a plug-in connector, as shown, via a radio frequency link, as described above, or via an infrared, visible light or other radiation spectrum link. Moreover, the display 72 is operable to communicate information to an operating technician, including information pertaining to current operator status, calibration status, and other explanatory information. The calibration unit 70 also may prompt an operating technician to take certain actions via a single or multi-character numeric or alphanumeric display or by a series of indicators, such as discrete LEDs arranged in a vertical or horizontal row or other matrix. As indicated above, the switch actuators provide input for calibration versus the normal run mode of the operator, menu scrolling functions, backlight activation and function-set or clear commands. Although discrete electromechanical switch actuators are indicated by the numerals 74, 76, 78, 80 and 82, see FIG. 3 also, the switch actuators could be of types associated with DIP switches, conductive rubber buttons, rotary switches, capacitive input devices, touch screen input devices, or other input devices including other types of electromechanical switches or devices that serve the same purpose.

As mentioned above, the operating protocol for the set up and calibration unit 70 includes a normal run mode and a calibration mode whereby, in the calibration mode, a calibration of several features may be carried out wherein the scroll keys allow the operating technician to quickly cycle through the available sequence of features. Still further, the set/clear switch actuator 82 allows the operating technician to alter the parameter that is currently selected and the display 72 will indicate the current parameter setting within the operator controller or other accessory connected thereto.

Selected calibration procedures will now be described. If it is desired to set the controller 63 for the operator 21 to require constant contact of the switch actuators 40*a* and 40*b*, for example, the calibration unit is operated as follows. Switch actuator 74 is actuated to enter the calibration mode, followed by actuation of switch actuator 82 until the display 72 reads, for example, "OPEN MODE-C-STP" followed by actuation of switch 78 or 80 until the display reads "CLOSE MODE", followed by actuation of switch actuator 82 until the display reads "CLOSE MODE-C-STP" followed by actuation of switch actuator 74 to return to the operator run mode.

Consider that the barrier position limit switches are similar to those described in U.S. patent application Ser. No. 10/989,479, filed Nov. 16, 2004 by Angiuli et al. and assigned to the assignee of the present invention. Alternatively, the barrier position limits may be determined by other mechanical or electrical sensors or substantially electronically by the controller 63 using input signals from the operator drive motor or a sensor connected thereto, for example. The first step would, typically, be to verify that the open and close operating modes are set to constant contact. This step is followed by actuation of switch actuator 74 until the operator 21 is in the run mode. Then the switch actuator 84 or 40*a* may be actuated to move the barrier to the desired open position followed by release of the aforementioned switch actuator. At this time, the limit switch mechanism itself, if of the type first referred to above, may be manipulated appropriately to set the limit position. Then, the switch actuator 40*b* or 86 may be actuated to move the barrier to within two inches of the floor 31, for example, and the limit switch mechanism or limit switch itself positioned accordingly.

Setting a limit switch overrun in the barrier closing mode may be accomplished by pressing switch actuator 74 to enter the calibration mode and then switch actuator 80 to scroll to a selected preset limit overrun condition which may be in increments indicated as 0 to 9, for example. Switch actuator 82 is then actuated until the display 72 reads the desired value (0 to 9). Switch actuator 84 is then actuated to open the barrier a few feet then release the switch actuator. Switch actuator 86 is then actuated to close the barrier 20 until the operator 21 stops the barrier. A bottom edge seal should be appropriately engaged with the floor 31. If not, the previous steps for setting the limit overrun are carried out until the desired limit overrun position is reached and the process is then followed by actuation of the switch actuator 74 to return to the so-called run mode.

Activation of an obstruction detector, such as the obstruction detector 42, 44, may be carried out with the calibration unit 70 by actuating switch 74 to place the unit and the controller 63 in the calibration mode. Switch actuator 80 is then actuated until the display 72 reads "ODC STB", for example. Switch actuator 82 is then actuated until the display reads "ODC STB ON" and the switch 74 is then actuated to return the system to the run mode. To deactivate the obstruction detector 42, 44 the same set of steps is carried out until the display reads "ODC STB OFF".

Additional features which may be set up or calibrated with the calibration unit 70, include setting a midstop position for the barrier 20 between full open and closed positions. Setting a midstop position is carried out by actuation of switch actuator 74 to enter the calibration mode, actuation of switch actuator 86 to close the barrier to the down limit and actuation of switch actuator 80 until the display 72 reads "MIDSTOP CLEAR". The barrier 20 is then moved toward an open position by actuation of switch actuator 84 until the desired midstop position is reached and the switch actuator is released. Switch actuator 82 is then actuated until display 72 reads "MIDSTOP SET" followed by actuation of switch actuator 74 to return to the run mode of the controller 63. The midstop position may be cleared by actuation of switch actuator 74 and switch actuator 80, then actuation of switch actuator 82 until the display reads "MIDSTOP CLR" followed by returning to the run mode through momentary actuation of switch actuator 74.

The controller 63 may include a maximum run time feature which requires that the barrier 20 move from one limit to another within a preset time period. Typically, upon installation of an operator 21 and controller 63, the maximum run time is established automatically by the controller 63 by measuring the open and close run times during initial runs of the operator in the run mode. A factory set value may be added to this measured value and the resulting sum stored as the maximum run timer value for a given direction of travel. If the maximum run time is exceeded in a subsequent "normal" cycle of operation, the operator 21 stops and may reverse if the barrier is moving toward the closed position. The maximum run time feature may provide that the operator 21 not respond to any further commands following a maximum run time being exceeded until a reset operation is carried out by the calibration unit 70, which may be accomplished by actuating any of the switch actuators or keys of the calibration unit, except actuators 84, 86 and 88. Alternatively, the controller 63 may also be operable to restore full function to the operator 21 by cycling electrical power off and then back on to operator 21. The controller 63 may include a feature whereby factory default values for the maximum run timers may be restored. Switch actuator 74 may be actuated, for example, to enter the calibration mode followed by actuation of switch actuator 80 to reach the position on the display which reads "MAX RUN TMR-SET", followed by actuation of the set/clear actuator 82 until the display reads "MAX RUN TMR-CLEAR". This action will set the maximum run times to a default value. The controller 63 may then be returned to the run mode by actuation of switch actuator 74.

Once the limit switch operation and obstruction detector operation modes have been set, the operator 21 may be placed in the so-called momentary contact operating mode wherein only momentary contact of the switch actuators 40*a*, 40*b* or one of actuators 66*a*, 66*b*, 66*c* and 66*d*, or one of actuators 84 and 86 are required to carry out the operation desired. Actuation of switch actuators 74, 80, 82, and then 74 are carried out. For example, switch actuator 74 is actuated to enter the CAL/RUN mode and then switch actuator 80 is actuated until the display reads OPEN MODE-(X) displaying a present setting. Switch actuator 82 is actuated until the display reads MOM then momentary contact will cause the door to open to its limit position. After setting the opening mode the switch actuator 74 may be actuated to return to the operator run mode.

Setting of the door or barrier closing mode is displayed and carried out in somewhat the same manner including actuation of switch actuator 74, 78 or 80 until the display reads CLOSE MODE-(X) to display the present setting followed by actuation of switch actuator 82 until a desired operating mode "C-STP" or "MOM" is displayed followed by pressing switch actuator 74 to return to the operator run mode.

Still additional features which setup and calibration unit 70 may display, or carry out, include an operator cycle count. Controller 63 is operable to store data regarding the number of cycles the barrier 20 has been operated through and this information may be displayed by way of the unit 70 by actuation of switch actuator 74, 78 or 80 until the display reads "CYCLES-(#)". This action is followed by restoring the operator controller 63 to the run mode. Essentially the same steps are utilized to determine the version number of the firmware used in the controller 63, the particular type of operator in use and to display a selected number of error codes which may be stored in the operator controller 63. For example, to aid in trouble-shooting operational problems, the operator 21 may be provided with a memory that stores the last ten error events by storing the last ten error codes in sequence. Once ten error codes are stored, the oldest code is erased to make room for the newest code. These codes may be displayed on the display 72 in the calibration mode of operation and the display may flash the number of the error code and the code itself followed by a description of the error code.

The controller 63 may also include a run code memory that stores the last ten run events in sequence and which may be displayed on display 72 in the calibration mode by flashing the number of the run code and a description of the code itself. Any number of operator run codes and error codes, may of course, be programmed into the microcontroller 100 for display by the display 72 when the calibration unit is connected to the controller 63 and the status of the operator 21 is ascertained. The two digit run codes and error codes are typically stored in the microcontroller 63 and may be transferred to the microcontroller 100 for display on the display 72.

Figure 7:
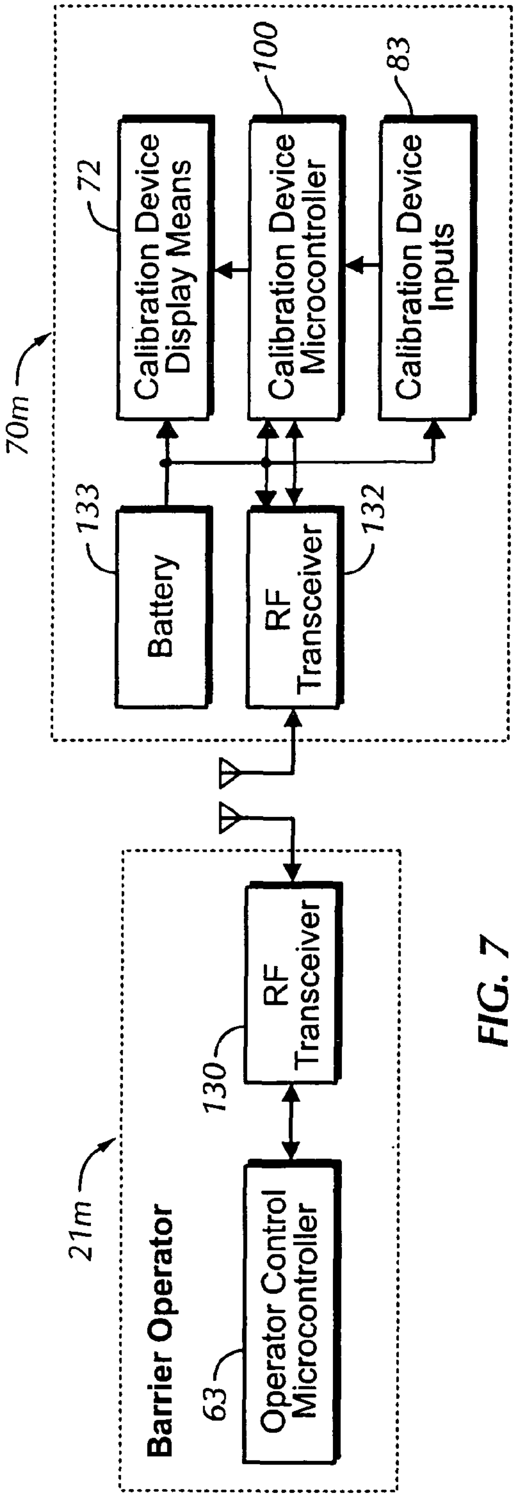
FIG. 7 is a somewhat generalized block diagram of an embodiment of the invention wherein communication with a barrier operator and its control microcontroller is carried out by way of radio frequency (RF) communication.

Referring now to FIG. 7, there is illustrated a modified operator 21*m* which is similar in many respects to the operator 21 and includes the operator controller or microcontroller 63, and a radio frequency transceiver 130 operably connected thereto. Power for transceiver 130 may be furnished from the same source as that which powers microcontroller 63. FIG. 7 also illustrates a modified calibration unit or device 70*m* which includes the calibration display 72, the calibration unit or device controller 100 and the calibration input means 83. Calibration device microcontroller 100 is operably connected to an RF transceiver 132 whereby the calibration unit or device 70*m* may carry out all communications necessary to calibrate and control the operator 21*m* via radio frequency signals. A battery 133 furnishes power to microcontroller 100 and transceiver 132.

Figure 8:
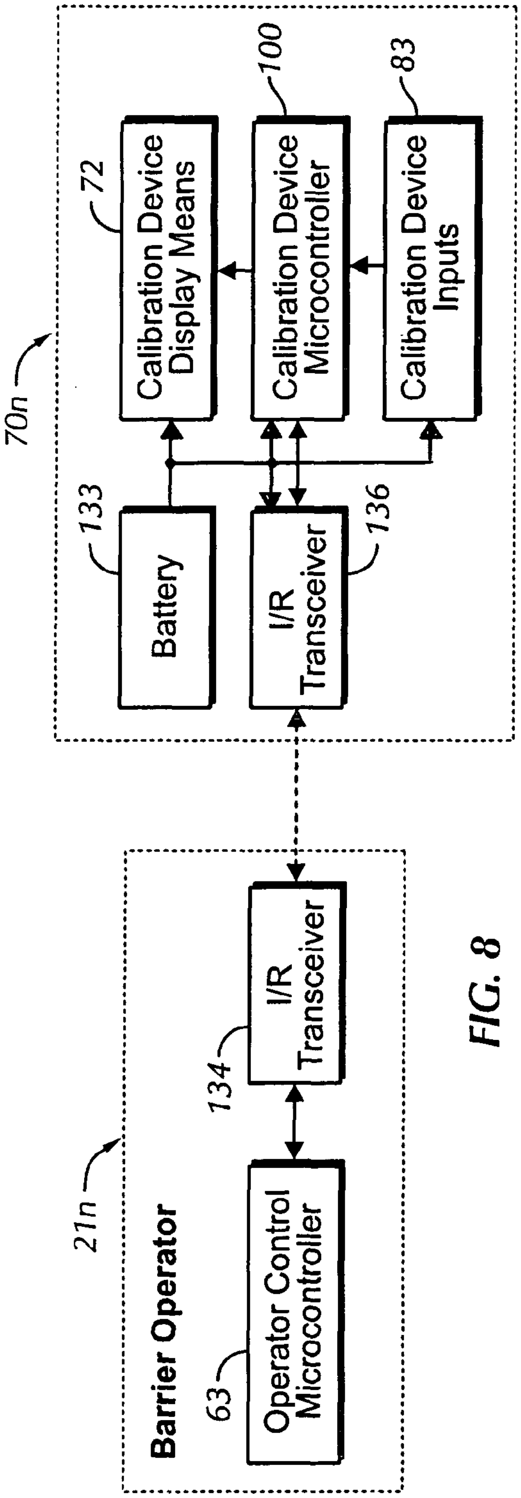
FIG. 8 is a block diagram similar in some respects to FIG. 7 of an embodiment of the invention whereby communication between a calibration unit or device and an operator controller or microcontroller is carried out by IR or visible light spectrum communications.

FIG. 8 illustrates an operator 21*n* and a calibration unit or device 70*n* both similar in several respects to the operator 21*m* and the calibration unit 70*m*, but including I/R (Infrared) transceivers 134 and 136 operably connected, respectively, to the controller 63 and the controller or microcontroller 100 whereby the calibration unit 70*n* may conduct all communications via the transceivers 134 and 136 with the operator controller 63 by way of infrared or visible light signal transmission. A battery 133 provides power to microcontroller 100 and transceiver 136.

Figure 9:
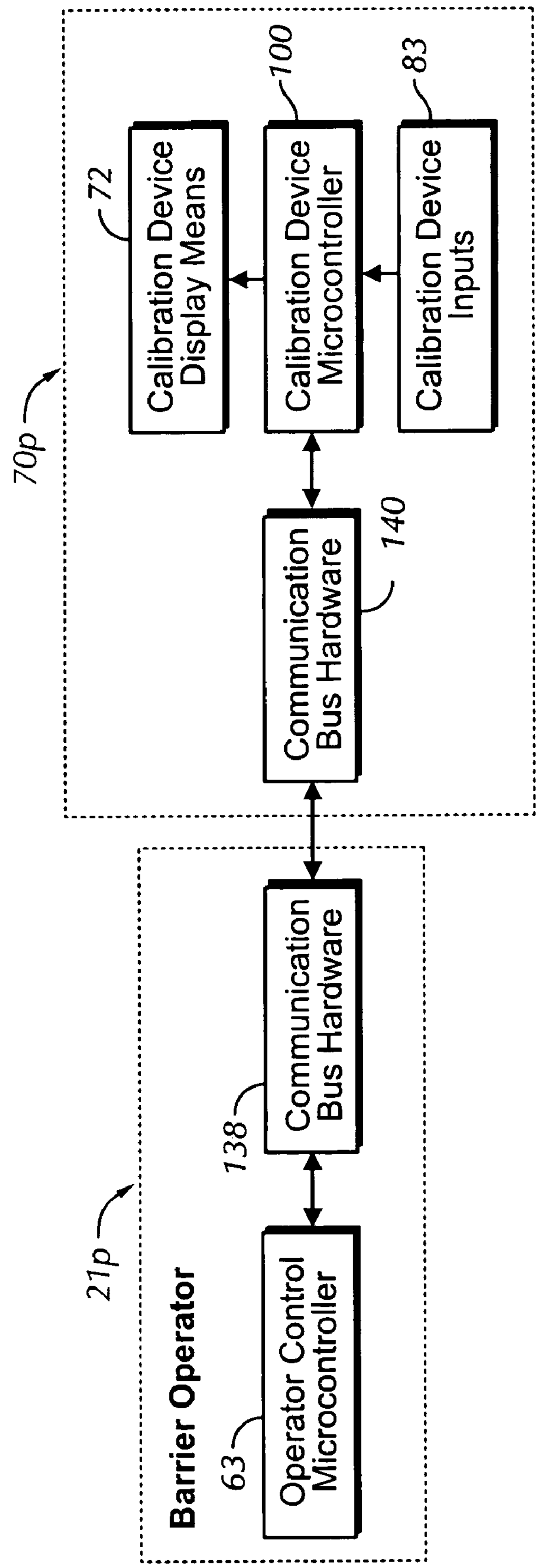
FIG. 9 is a block diagram similar to FIGS. 7 and 8 of an embodiment of the invention wherein communication between the calibration unit or device and the operator controller is via hard wiring.

Viewing FIG. 9, a modified operator 21*p* and a modified operator calibration unit 70*p* are illustrated and are substantially like the other embodiments described herein but include communication bus hardware 138 and 140, respectively, whereby communication between the operator 21*p* and the calibration unit 70*p* is carried out by so called hard wiring. Power for calibration unit 70*p* may be provided by a power supply for operator 21*p*, not shown in FIG. 9, and via suitable conductors associated with communication bus hardware 138, 140.

The construction and use of the barrier operator setup and calibration units 70, 70*m*, 70*n* and 70*p* is believed to be understandable to those of ordinary skill in the art from the foregoing description. Moreover, other functions which the calibration units of the invention may be capable of setting or adjusting include direction of barrier movement, maximum and minimum barrier velocity in opening and closing modes, acceleration/deceleration rates (as the barrier approaches limit positions, for example), date and time of a real-time clock used to determine event timing, service intervals for the barrier and/or operator, timing and operating parameters for automatic operation features and timing of activating visual and/or audio warning devices, and determining the type of barrier being controlled followed by adjusting operator control parameters, accordingly. Although preferred embodiments of the calibration unit and methods of operation of same have been described in detail herein, those skilled in the art will also recognize that various substitutions and modifications may be made without departing from the scope and spirit of the appended claims.

What is claimed is:

1. In combination with a barrier control system for directing the movement of a barrier between open and closed positions, the barrier control system including a motor for effecting movement of the barrier and a barrier microcontroller for controlling the movement of the barrier, a calibration and set-up unit separate and apart from, and removably associated with, the barrier control system, said calibration and set-up unit effective to recognize the specific type of barrier control system to which it is associated and provide at least one of the defined functions of (i) setting the operator parameters of the barrier control system, (ii) analyzing any fault conditions that may exist within the barrier control system, and (iii) modifying the operating parameters of the barrier control system, said calibration and set-up unit including:

a calibration microcontroller in communication with said barrier microcontroller when said calibration and set-up unit is associated with said barrier control system;

a visual display operably connected to said calibration microcontroller; and a set of input switch actuators operably connected with said calibration microcontroller, said switch actuators including a set/clear switch actuator, a calibrate/run switch actuator and at least one menu switch actuator for selecting a calibration step or steps for enabling said calibration microcontroller to carry out various settings of said barrier microcontroller.

2. The calibration and set-up unit set forth in claim 1 wherein:

said calibration and set-up unit is mounted on a structure constituting the housing for said barrier microcontroller.

3. The calibration and set-up unit set forth in claim 1 wherein:

said calibration microcontroller is in wireless communication with said barrier microcontroller when said unit is associated with said barrier control system.

4. The combination as set forth in claim 3 in which the barrier control system also includes an RF transceiver and the calibration and set-up unit additionally includes an RF transceiver, and the barrier and calibration microcontrollers communicate with one another by way of said RF transceivers.

5. The calibration and set-up unit set forth in claim 1 wherein:

said calibration microcontroller is operable for controlling said barrier microcontroller in a normal run mode and a calibration mode by way of said switch actuators to alter a selected operating parameter presently selected and indicated on said visual display.

6. The calibration and set-up unit set forth in claim 1 wherein:

said calibration microcontroller provides for display of indicia on said visual display to verify that a barrier open and close operating mode of said barrier control system are set to one of constant contact by switch controls for controlling said barrier microcontroller and momentary contact of said switch controls for controlling said barrier microcontroller.

7. The calibration and set-up unit set forth in claim 1 wherein:

barrier position limit controls may be set by pressing at least one of said switch actuators to a selected preset limit condition indicated on said visual display.

8. The calibration and set-up unit set forth in claim 1 wherein:

said barrier control system includes an obstruction detector and said unit is operable to activate and deactivate said obstruction detector by actuation of selected ones of said switch actuators.

9. The calibration and set-up unit set forth in claim 1 wherein:

said calibration microcontroller is responsive to actuation of one of said switch actuators to enter a calibration mode and to set a midstop position of said barrier between barrier open and closed limit positions.

10. The calibration and set-up unit set forth in claim 1 wherein:

said calibration microcontroller is operable to provide for a maximum run time of said barrier control system motor settable or resettable by actuation of at least one of said switch actuators.

11. The calibration and set-up unit set forth in claim 1 wherein:

said calibration microcontroller is operable to query said barrier microcontroller to determine the number of cycles of at least one of opening and closing of said barrier as carried out by said barrier control system.

12. The calibration and set-up unit set forth in claim 1 wherein:

said calibration microcontroller includes means operable via said unit for displaying on said visual display a selected one of plural error codes stored in said barrier microcontroller.

13. The calibration and set-up unit set forth in claim 1 wherein:

said calibration microcontroller is operable to query said barrier microcontroller to display a selected number of operating events carried out by said barrier control system.

14. The combination as set forth in claim 1, wherein said separate calibration and set-up unit is further effective to determine which optional accessory features may be operably coupled with the barrier microcontroller, and provide a checklist of calibration and set-up functions to perform.

15. The calibration and set-up unit set forth in claim 1, wherein said calibration microcontroller has no ability to control the movement of said barrier.

16. The calibration and set-up unit set forth in claim 1, wherein said barrier microcontroller has no ability to provide said defined functions.

17. In combination with a barrier control system for directing the movement of a barrier between open and closed positions, the barrier control system including a motor for effecting movement of the barrier and a barrier microcontroller for controlling the movement of the barrier, a calibration and set-up unit separate and apart from, and removably associated with, the barrier control system, said calibration and set-up unit effective to recognize the specific type of barrier control system to which it is associated and provide at least one of the defined functions of (i) setting the operator parameters of the barrier control system, (ii) analyzing any fault conditions that may exist within the barrier control system, and (iii) modifying the operating parameters of the barrier control system, said calibration and set-up unit including:

a calibration microcontroller having no ability to control the movement of said barrier, said calibration microcontroller in communication with said barrier microcontroller when said calibration and set-up unit is associated with said barrier control system;

a visual display operably connected to said calibration microcontroller; and a set of input switch actuators operably connected with said calibration microcontroller, said switch actuators including a set/clear switch actuator, a calibrate/run switch actuator and at least one menu switch actuator for selecting a calibration step or steps for enabling said calibration microcontroller to carry out various settings of said barrier microcontroller.

18. The calibration and set-up unit set forth in claim 17, wherein said barrier microcontroller has no ability to provide said defined functions.

19. In combination with a barrier control system for directing the movement of a barrier between open and closed positions, the barrier control system including a motor for effecting movement of the barrier and a barrier microcontroller for controlling the movement of the barrier, a calibration and set-up unit separate and apart from, and removably associated with, the barrier control system, said calibration and set-up unit effective to recognize the specific type of barrier control system to which it is associated and provide at least one of the defined functions of (i) setting the operator parameters of the barrier control system, (ii) analyzing any fault conditions that may exist within the barrier control system, and (iii) modifying the operating parameters of the barrier control system, said calibration and set-up unit including:

a calibration microcontroller in communication with said barrier microcontroller, said barrier microcontroller having no ability to provide said defined functions, when said calibration and set-up unit is associated with said barrier control system;

a visual display operably connected to said calibration microcontroller; and a set of input switch actuators operably connected with said calibration microcontroller, said switch actuators including a set/clear switch actuator, a calibrate/run switch actuator and at least one menu switch actuator for selecting a calibration step or steps for enabling said calibration microcontroller to carry out various settings of said barrier microcontroller.

20. The calibration and set-up unit set forth in claim 19, wherein said calibration microcontroller has no ability to control the movement of said barrier.

* * * * *